United States Patent [19]

Chern et al.

[11] Patent Number: 5,788,938
[45] Date of Patent: Aug. 4, 1998

[54] RECOVERY OF TUNGSTEN FROM FERROTUNGSTEN

[75] Inventors: Jia-Ming Chern, Hsin Tien, Taiwan; Thomas A. Wolfe, Towanda, Pa.; Michael J. Miller, Towanda, Pa.; Clarence D. Vanderpool, Towanda, Pa.

[73] Assignee: Osram Sylvania Inc., Danvers, Mass.

[21] Appl. No.: 658,451

[22] Filed: Jun. 5, 1996

[51] Int. Cl.$^6$ ..................... C01G 37/14
[52] U.S. Cl. ..................... 423/58
[58] Field of Search ............. 423/53, 58, 606, 423/593

[56] References Cited

U.S. PATENT DOCUMENTS

| | | | |
|---|---|---|---|
| 2,339,888 | 1/1944 | Smith | 423/58 |
| 2,704,240 | 3/1955 | Avery | 23/140 |
| 3,887,680 | 6/1975 | MacInnis et al. | 423/55 |
| 3,911,077 | 10/1975 | Martin et al. | 423/58 |
| 3,953,194 | 4/1976 | Hartline, III et al. | 75/0.5 BC |
| 4,288,216 | 9/1981 | Christini et al. | 432/112 |
| 4,288,217 | 9/1981 | Christini et al. | 432/112 |
| 4,353,878 | 10/1982 | Quatrini et al. | 423/53 |
| 4,360,502 | 11/1982 | MacInnis et al. | 423/54 |
| 4,369,165 | 1/1983 | Kim et al. | 423/54 |
| 4,552,729 | 11/1985 | Miller et al. | 423/56 |

FOREIGN PATENT DOCUMENTS

| | | | |
|---|---|---|---|
| 521998 | 2/1956 | Canada | 423/606 |
| 1047980 | 10/1983 | U.S.S.R. | 423/58 |

*Primary Examiner*—Steven Bos
*Attorney, Agent, or Firm*—Robert F. Clark

[57] ABSTRACT

A method is provided whereby tungsten values are recovered from ferrotungsten by completely oxidizing the ferrotungsten at high temperatures in an oxygen atmosphere followed by digestion with sodium hydroxide to form soluble sodium tungstate. The sodium tungstate is then purified by conventional means. The method may be used to recover at least about 90% of the tungsten values present in the ferrotungsten.

9 Claims, 4 Drawing Sheets

RECOVERY OF TUNGSTEN FROM FERROTUNGSTEN

TECHNICAL FIELD

This invention relates to the recovery of tungsten values from tungsten containing materials. More particularly, it relates to the recovery of tungsten values from ferrotungsten.

BACKGROUND ART

Ferrotungsten is manufactured as a raw material for use in the steel industry as a dopant to make tungsten containing steel. Ferrotungsten typically consists of 60–80 wt. % tungsten, <2.5 wt. % carbon, <1 wt. % silicon, and balance iron. Because of its high tungsten content, scrap ferrotungsten is a potential source of tungsten and tungsten compounds. Thus, it would be desirable to have a method for recovering tungsten values from ferrotungsten because of its high tungsten content.

SUMMARY OF THE INVENTION

It is an object of the invention to provide a method for recovering tungsten values from ferrotungsten.

It is a further object of the invention to provide a commercially feasible method of extracting tungsten values from ferrotungsten.

In accordance with one object of the invention a method is provided for recovering tungsten values from ferrotungsten, comprising: calcining the ferrotungsten in an oxygen containing atmosphere to form a completely oxidized ferrotungsten material; digesting the completely oxidized material in sodium hydroxide to form a soluble sodium tungstate; and obtaining the tungsten values from the soluble sodium tungstate.

In accordance with another object of the invention, the method includes calcining the ferrotungsten at a temperature above about 900° C.

DESCRIPTION OF THE PREFERRED EMBODIMENTS

Figure 1:
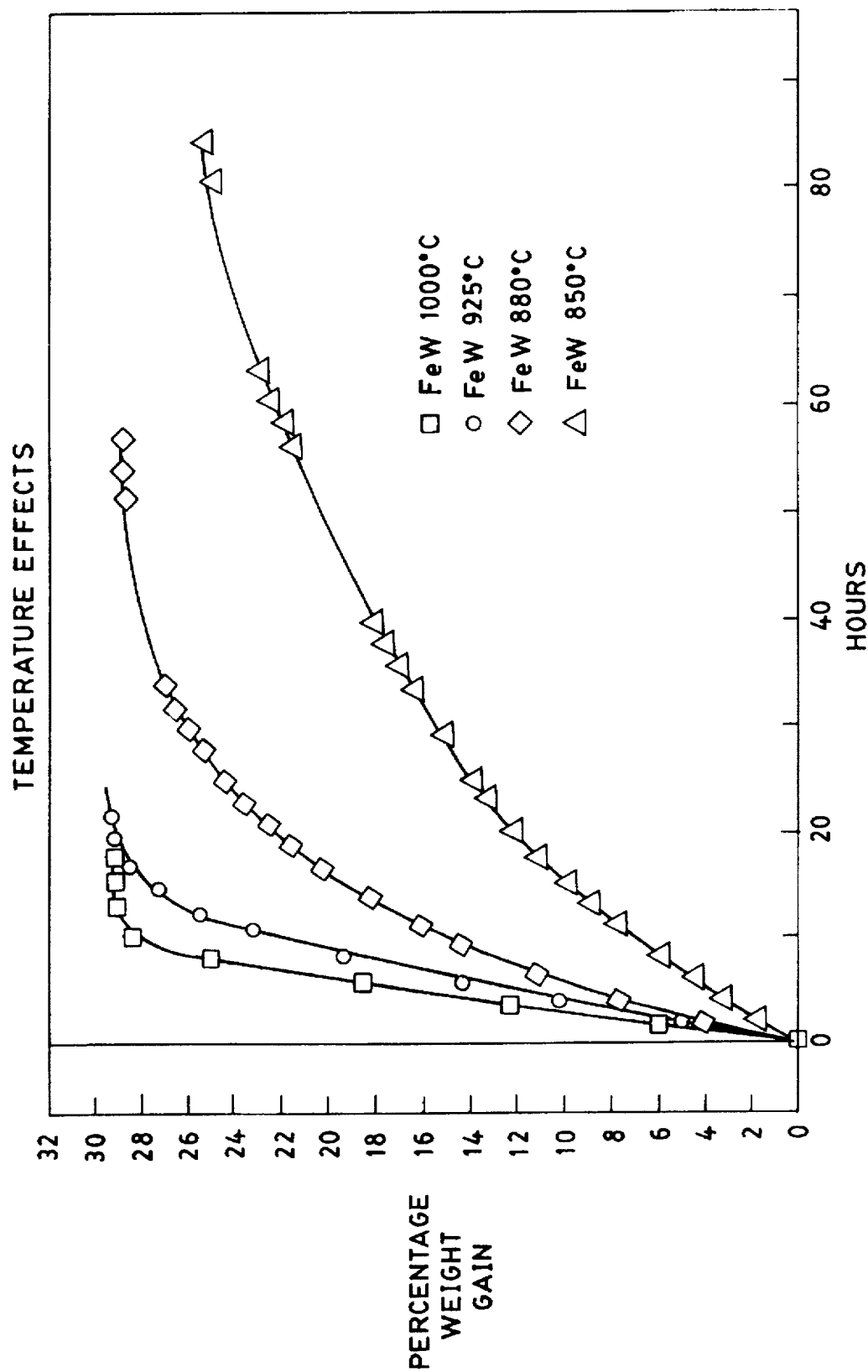
FIG. 1 is a graphical representation of the effect of temperature on the oxidation of ferrotungsten.

For a better understanding of the present invention, together with other and further objects, advantages and capabilities thereof, reference is made to the following disclosure and appended claims taken in conjunction with the above-described drawings.

A method for the recovery of tungsten from ferrotungsten has been developed whereby at least about 90% of the tungsten may be recovered from ferrotungsten scrap. The method is comprised of calcining the ferrotungsten at a high temperature in an oxygen containing atmosphere. During calcination, an oxygen containing gas is flowed through the calciner to promote oxidation. Calcining is continued until the ferrotungsten becomes completely oxidized. The oxidized ferrotungsten is then digested using sodium hydroxide to form a soluble sodium tungstate, $Na_2WO_4$. Once in solution, the $Na_2WO_4$ can then be purified and processed by conventional hydrometallurgical techniques. Examples of such hydrometallurgical techniques can be found in U.S. Pat. Nos. 4,360,502 to MacInnis, 4,369,165 to Kim, 4,552,729 to Miller, and 2,339,888 to Smith which are incorporated herein by reference.

In order to achieve high recovery efficiencies for tungsten, it is necessary that the ferrotungsten be completely oxidized. The amount of oxidation can be monitored by measuring the weight gain of the ferrotungsten during calcining. As defined herein, the ferrotungsten is completely oxidized when there is no further weight gain in the calcined material. It is believed that the ferrotungsten is essentially oxidized to $WO_3$, $FeWO_4$ and $Fe_2O_3$. The rate of oxidation of the ferrotungsten is affected by the calcining temperature, the size of the ferrotungsten scrap, and the oxygen content of the atmosphere in the calciner. In particular, it has been found that above about 900° C. the rate of oxidation of ferrotungsten is greatly enhanced. For example, at 1000° C., complete oxidation of ferrotungsten can be achieved in about 14 hours. Under similar conditions at 925° C., the time to complete oxidation is about 20 hours. At 880° C., about 60 hours are needed. And, at 850° C., the ferrotungsten is only about 80% oxidized after 68 hours. Thus, there is a dramatic increase in the oxidation rate above about 900° C. The rate of oxidation is an important consideration in being able to reclaim tungsten from ferrotungsten on a commercially feasible scale.

The rate of oxidation can be further enhanced by reducing the ferrotungsten particle size to −¼ mesh size. The size reduction may be achieved by mechanical milling or sieving to remove the larger fraction. Additionally, the rate of oxidation may also be increased by enhancing the concentration of oxygen in the calciner atmosphere. This may be accomplished by increasing the flow rate of the oxidizing gas into the calciner or by augmenting the amount of oxygen in the gas.

The following examples are provided to enable those skilled in the art to more clearly understand and practice the invention. These examples should not be considered as a limitation upon the scope of the invention, but merely as being illustrative and representative thereof.

Oxidation tests on representative ferrotungsten samples were performed in air at different temperatures in a muffle furnace. Samples of ferrotungsten were weighed and placed in previously weighed crucibles. The crucibles were then placed in a muffle furnace which had been heated to the desired temperature. The crucibles were removed at approximately 2 hours intervals, cooled, and weighed. Heating in the muffle furnace was continued until no further weight gain was observed. The data for these experiments are represented in FIG. 1.

FIG. 1 demonstrates the effect of temperature on the oxidation rate of ferrotungsten. In FIG. 1, the percent weight gain of the ferrotungsten (FeW) at different temperatures is plotted against time. The data in FIG. 1 reveal that there is a significant increase in the oxidation rate of ferrotungsten above about 900° C. Unfortunately, the increase rate of oxidation at higher temperatures becomes limited by the ability of the calciner to effectively operate at the higher temperatures while handling production quantities of ferrotungsten. For a typical commercial calciner, the calciner is normally limited to operating at temperatures less than about 1000° C. because the calciner tube must be made out of alloys which have sufficient strength to handle the heavy and abrasive ferrotungsten. This excludes higher temperature tube materials such as alumina and silicon carbide which do not possess the needed strength. Therefore, to increase the rate of oxidation further, it is necessary to either decrease the particle size of the ferrotungsten being calcined or increase the oxygen content of the calciner atmosphere. The effects of these parameters on the oxidation rate of ferrotungsten are described below.

Figure 2:
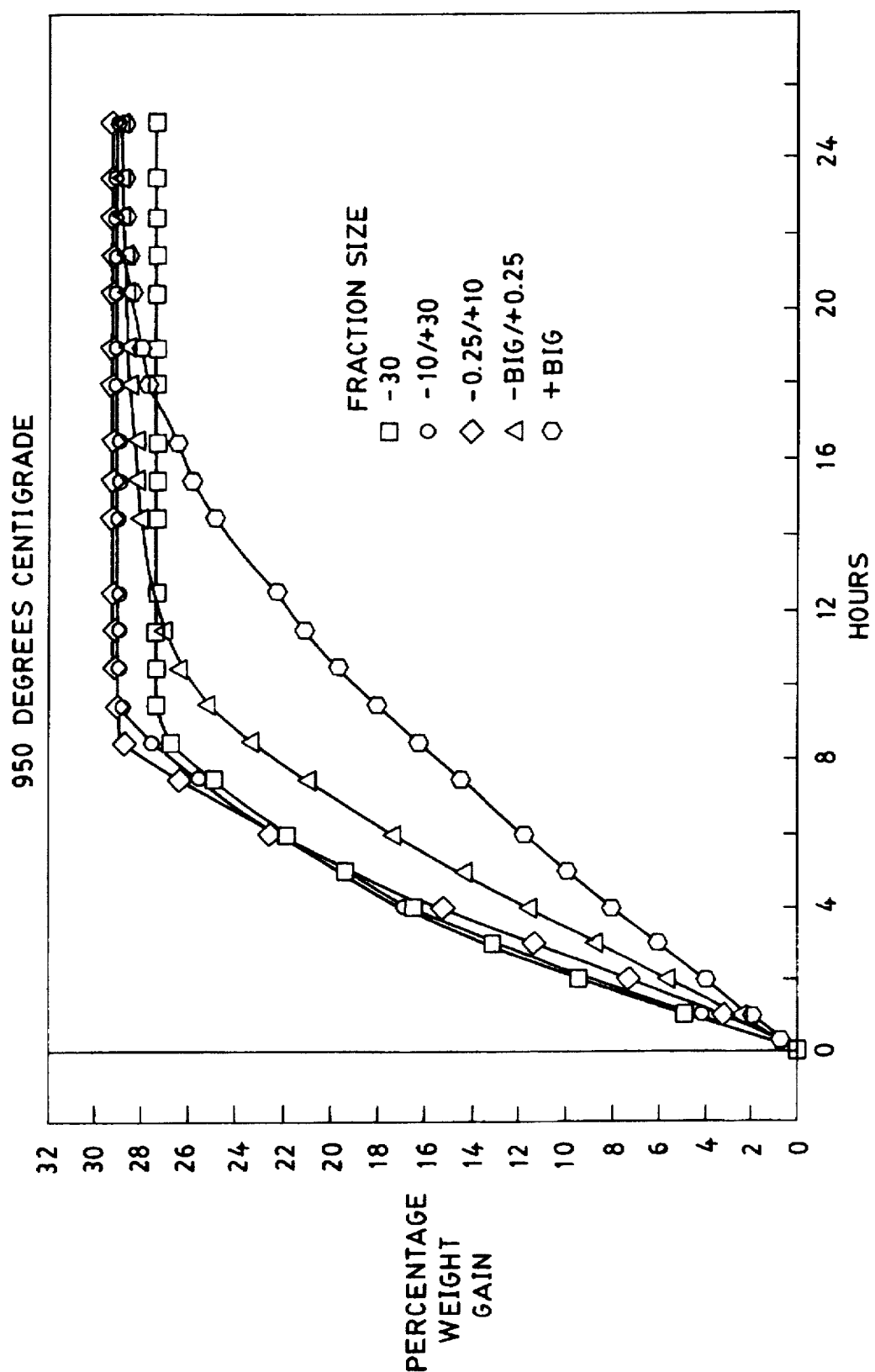
FIG. 2 is a graphical representation of the effect of particle size on the oxidation of ferrotungsten.

The effect of particle size on the oxidation rate of ferrotungsten was determined using a procedure similar to the method used to evaluate the effect of temperature on the oxidation rate. In this set of experiments, the furnace temperature was maintained at a constant 950° C. and the crucibles were removed at approximately 1 hour intervals. The ferrotungsten was separated into five fractions by sieving through a series of screens. The screens sizes were "big," ¼ mesh, 10 mesh, and 30 mesh. The "big" screen had diamond shaped opening measuring 5/16 by 7/8 inches. The oxidation curves for the different fractions are given in FIG. 2. The finer fractions (−30 mesh, +30 to −10 mesh, and +10 to −¼) appear to completely oxidize in about 9.5 hours. The two larger fractions require a much longer time, approximately 23 hours. Accordingly, it is desirable to reduce the particle size of the ferrotungsten to −¼ mesh in order to minimize the time required to completely oxidize the ferrotungsten.

Two additional sets of experiments were conducted in a laboratory tube furnace to determine the effect of the gas flow rate and oxygen content of the gas on the rate of oxidation. Collectively, both parameters dictate the amount of oxygen present in the furnace atmosphere during oxidation. In the first set experiments, approximately 100 grams of ferrotungsten was placed into a heated laboratory tube furnace. The oxygen content of the oxidizing gas flowing through the furnace was maintained at 20% by volume (balance nitrogen) while effects of different gas flow rates and furnace temperatures were evaluated. After two hours, the boat was removed and allowed to cool. Once, the weight of the partially oxidized ferrotungsten was recorded, the partially oxidized ferrotungsten was placed in a second tube furnace and completely oxidized (900° C., air (21% $O_2$), 6 scfh). The final weight of the completely oxidized material was used to calculate the percent oxidation of the partially oxidized material at 2 hours. In the second set of experiments, the experimental setup was the same as the first except that the oxygen content was varied and the flow rate was fixed at 6 scfh.

Figure 3:
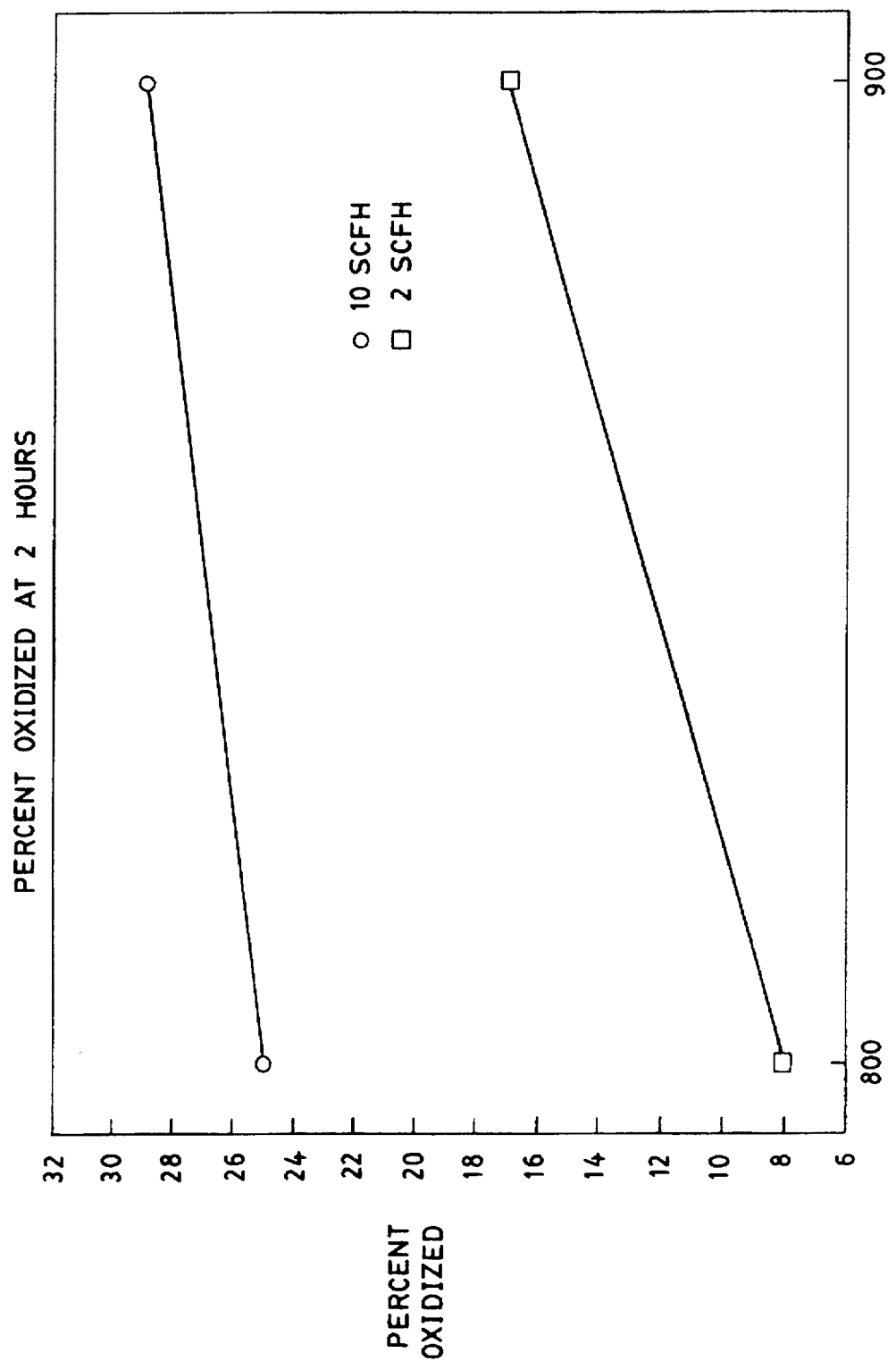
FIG. 3 is a graphical representation comparing the effects of temperature and gas flow rate on the oxidation of ferrotungsten.
Figure 4:
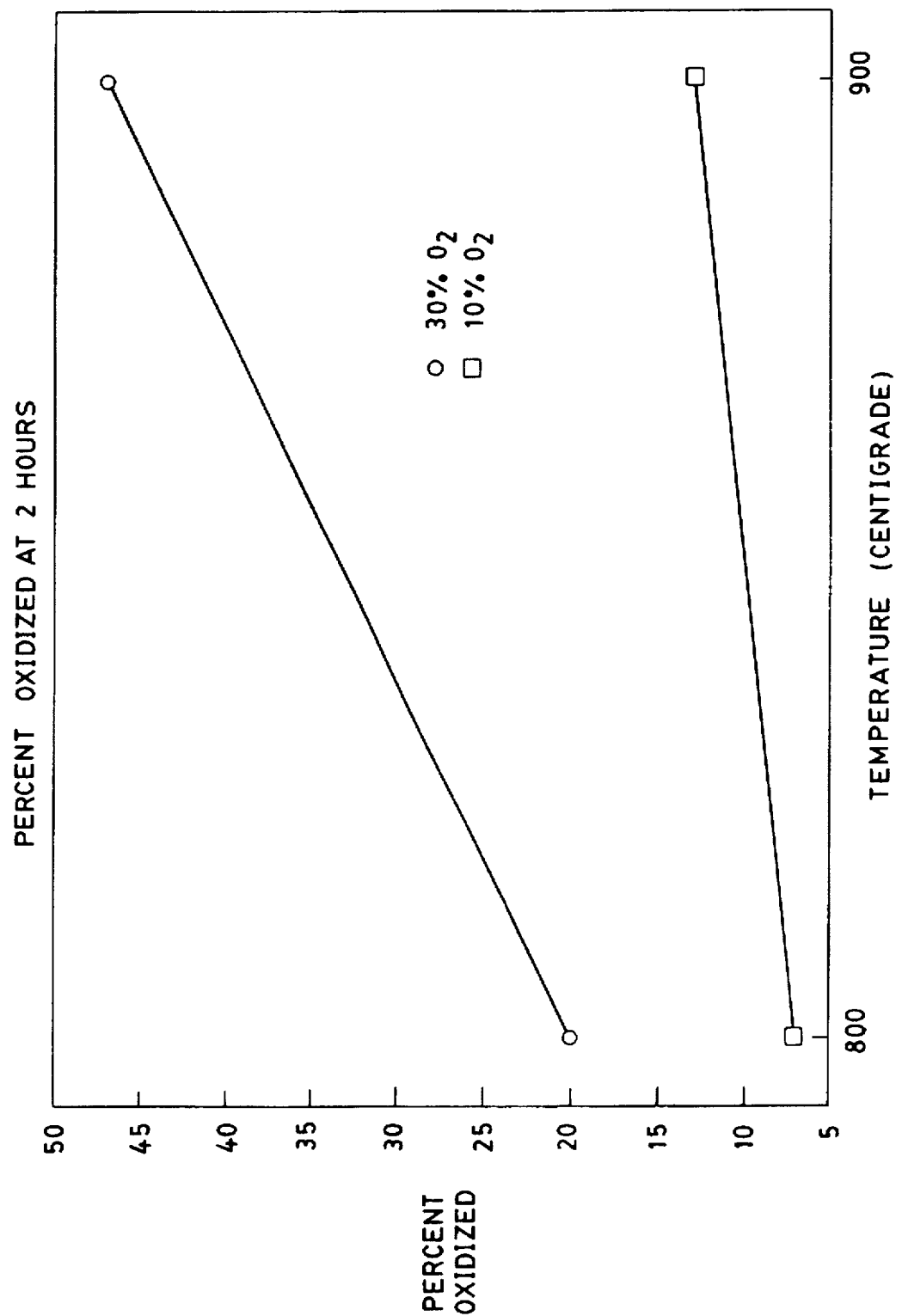
FIG. 4 is a graphical representation comparing the effects of temperature and oxygen content of the gas stream on the oxidation of ferrotungsten.

FIG. 3 shows that the increase in the flow rate of gas through the furnace had a larger effect on the amount of oxidation after 2 hours than the increase in the furnace temperature. The highest percentage of oxidation after 2 hours was achieved using the combination of high temperature and high flow rate, i.e., 900° C. and 10 scfh. FIG. 4 shows that the increase in the oxygen content of the gas flowing through the furnace yielded a substantially greater percentage of oxidation after 2 hours than did the increase in furnace temperature. Again, the greatest amount of oxidation after 2 hours was obtained using the combination of higher $O_2$ content and higher furnace temperature, i.e., 30% $O_2$ and 900° C. Thus, the results of both experiments indicate that increasing the oxygen content of the furnace atmosphere either by increasing the flow rate of the oxygen containing gas or by increasing the oxygen content of the gas itself can significantly improve the oxidation rate.

Sodium hydroxide tests were performed to test the digestibility of the completely oxidized ferrotungsten material.

Two digestion procedures were used, "low NaOH" and "high NaOH." The "low NaOH" tests were performed by adding the desired amount of NaOH to 0.2 l of deionized (DI) water. The molar ratio of NaOH/W for each test is given in Table 1. Each "low NaOH" test was roughly sized for approximately 150 ml of 25% (8 to 9N) NaOH per 60 g of $WO_3$. The caustic solution was cooled to between 10° C. to 15° C. and the completely oxidized ferrotungsten material was added. After slurrying for 1 hour, the slurried material was added to a stainless steel reactor and digested at 120° C. for 4 hours. The slurry was diluted with 0.2 to 0.3 l of DI water and filtered. The solids were slurried with about 0.3 l of hot DI water for 1 hour and filtered. Both filtrates were combined and analyzed for tungsten by atomic absorbance (AA). The solids were analyzed by x-ray fluorescence (XRF). The "high NaOH" digestions were performed by adding the desired amount of NaOH to a stainless steel reactor and heating to 120° C. These tests were roughly sized for approximately 150 ml of 50% (~19N) NaOH per 60 g of contained $WO_3$. The completely oxidized ferrotungsten was slowly added to the reactor and digested for 3 hours. The slurry was diluted with 0.5 l of DI water and filtered. The solids were twice slurried with 0.5 l of DI water and filtered. A final wash was performed in the filter with 0.3 l of DI water. The filtrates were combined and analyzed by AA. Solids were analyzed by XRF. The results of the digestion tests are given in Table 1. The tungsten recovery efficiency is defined as the total tungsten recovered in solution divided by the sum of the tungsten recovered in solution and the tungsten remaining in the solids.

TABLE 1

| Digestion Method | NaOH/W molar ratio | Oxidation Temp. (°C.) | W Recovery Efficiency (%) |
| --- | --- | --- | --- |
| Low NaOH | 3.7 | 1000 | 95 |
| Low NaOH | 4.2 | 1000 | 97 |
| Low NaOH | 4.1 | 1000 | 98 |
| High NaOH | 11.3 | 850 | 99 |
| High NaOH | 11.0 | 900 | 91 |
| High NaOH | 8.3 | 1000 | 89 |
| High NaOH | 11.3 | 925 | 94 |
| High NaOH | 11.2 | 1000 | 95 |

The data in Table 1 demonstrates that at least about 90% of the tungsten values may be recovered from the ferrotungsten using the method of this invention. The high recovery efficiencies demonstrate that the recovery of tungsten values from ferrotungsten can be commercially feasible. It is anticipated that recovery efficiencies might be further increased by using a high pressure sodium hydroxide digestion or a sodium hydroxide fusion.

While there has been shown and described what are at the present considered the preferred embodiments of the invention, it will be obvious to those skilled in the art that various changes and modifications may be made therein without departing from the scope of the invention as defined by the appended claims.

We claim:

1. A method for recovering tungsten values from ferrotungsten, comprising:

calcining the ferrotungsten in an oxygen containing atmosphere to form a completely oxidized ferrotungsten material;

digesting the completely oxidized material in sodium hydroxide to form a soluble sodium tungstate; and obtaining the tungsten values from the soluble sodium tungstate.

2. The method of claim 1 wherein the ferrotungsten is calcined at a temperature greater than about 90° C.

3. The method of claim 1 wherein the calcining is performed in a calciner having a gas flowing therethrough, said gas containing at least about 20% oxygen.

4. The method of claim 3 wherein the gas contains about 30% oxygen.

5. The method of claim 3 wherein the gas has a flow rate of greater than 2 scfh.

6. The method of claim 1 wherein the particle size of the ferrotungsten is −¼ mesh.

7. The method of claim 1 wherein at least about 90% of the tungsten values are recovered.

8. The method of claim 1 wherein digesting the completely oxidized material includes a high pressure digestion with sodium hydroxide.

9. The method of claim 1 wherein digesting the completely oxidized material includes a fusion with sodium hydroxide.

* * * * *